United States Patent
McGill

(10) Patent No.: US 8,828,108 B2
(45) Date of Patent: Sep. 9, 2014

(54) APPARATUS, SYSTEM, AND METHOD FOR PRODUCING ENERGY USING A STREAM OF LIQUID ALKALI METAL

(76) Inventor: Bruce McGill, Santa Clara, UT (US)

(*) Notice: Subject to any disclaimer, the term of this patent is extended or adjusted under 35 U.S.C. 154(b) by 902 days.

(21) Appl. No.: 13/011,206

(22) Filed: Jan. 21, 2011

(65) Prior Publication Data
US 2011/0117459 A1    May 19, 2011

Related U.S. Application Data

(63) Continuation-in-part of application No. 12/173,741, filed on Jul. 15, 2008, now Pat. No. 8,012,223.

(51) Int. Cl.
| C01B 3/08 | (2006.01) |
|---|---|
| B01J 4/00 | (2006.01) |
| H01M 8/06 | (2006.01) |
| C01B 3/10 | (2006.01) |
| B01J 7/02 | (2006.01) |
| C25C 3/02 | (2006.01) |

(52) U.S. Cl.
CPC ............... *B01J 4/001* (2013.01); *H01M 8/065* (2013.01); *B01J 2219/00103* (2013.01); *C01B 3/08* (2013.01); *Y02E 60/50* (2013.01); *B01J 4/004* (2013.01); *C01B 3/10* (2013.01); *C01B 2203/066* (2013.01); *B01J 7/02* (2013.01); *C25C 3/02* (2013.01); *H01M 8/0606* (2013.01); *Y02E 60/36* (2013.01)
USPC .............................................. 48/61; 423/657

(58) Field of Classification Search
CPC ......... C01B 3/08; C01B 15/0435; C01D 1/02
USPC ....................................... 48/61; 423/644, 657
See application file for complete search history.

(56) References Cited

U.S. PATENT DOCUMENTS

| 267,319 A | 11/1882 | Bernstein |
|---|---|---|
| 898,055 A | 11/1908 | MacMillan |
| 963,852 A | 7/1910 | Benko |
| 2,921,110 A | 1/1960 | Crowley et al. |
| 3,252,455 A | 5/1966 | Marshall |
| 3,490,871 A | 1/1970 | Miller et al. |
| 3,719,531 A | 3/1973 | Dzieciuch et al. |
| 3,791,871 A | 2/1974 | Rowley |
| 3,833,420 A | 9/1974 | Will |
| 3,833,422 A | 9/1974 | Will et al. |
| 3,911,284 A | 10/1975 | Skala |
| 3,928,075 A | 12/1975 | Bass |
| 3,939,007 A | 2/1976 | Sudworth et al. |

(Continued)

FOREIGN PATENT DOCUMENTS

JP        60012680        1/1985

*Primary Examiner* — Matthew Merkling
(74) *Attorney, Agent, or Firm* — Kunzler Law Group

(57) ABSTRACT

An apparatus, system, and method are disclosed for capturing electrical energy from a process designed for producing hydrogen. An electrode is placed within a stream of liquid alkali metal that flows through a titration module and interacts with water to produce, among other byproducts, hydrogen. Another electrode is placed within a reaction chamber that houses the water. The electrodes can then be coupled to a terminal, and during the hydrogen generation process (when the liquid alkali metal and water interact) the stream of liquid alkali metal acts as an anode and the electrode in the water as a cathode. Current flows, and energy is captured and made available as electrical energy at the terminal, which can be connected to electrical loads. The terminal may be connected with the terminal of a fuel cell that is consuming the hydrogen that is being produced, thus providing additional voltage and/or current.

19 Claims, 14 Drawing Sheets

(56) References Cited

U.S. PATENT DOCUMENTS

| | | | |
|---|---|---|---|
| 3,975,913 A | 8/1976 | Erickson | |
| 3,993,503 A | 11/1976 | Ludwig | |
| 4,001,043 A | 1/1977 | Momyer | |
| 4,035,554 A | 7/1977 | Halberstadt et al. | |
| 4,048,393 A | 9/1977 | Heintz et al. | |
| 4,247,605 A | 1/1981 | Paquette | |
| 4,356,163 A | 10/1982 | Davidson | |
| 4,387,505 A | 6/1983 | Shay | |
| 4,546,055 A | 10/1985 | Coetzer et al. | |
| 5,061,580 A | 10/1991 | Wedlake et al. | |
| 5,139,897 A | 8/1992 | Wedlake | |
| 5,277,891 A | 1/1994 | Newcomb et al. | |
| 5,286,473 A | 2/1994 | Hasebe et al. | |
| 5,604,053 A | 2/1997 | Coetzer et al. | |
| 5,867,978 A | 2/1999 | Klanchar et al. | |
| 5,972,533 A | 10/1999 | Coetzer et al. | |
| 6,007,943 A | 12/1999 | Coetzer | |
| 6,544,400 B2 | 4/2003 | Hockaday et al. | |
| 6,653,007 B2 | 11/2003 | McWhorter | |
| 6,834,623 B2 | 12/2004 | Cheng | |
| 7,037,483 B2 | 5/2006 | Suzuki et al. | |
| 7,306,780 B1 | 12/2007 | Kravitz et al. | |
| 2002/0006533 A1 | 1/2002 | Bergman | |
| 2004/0258966 A1 | 12/2004 | Mann et al. | |
| 2006/0073368 A1 | 4/2006 | Chiu | |
| 2006/0174952 A1 | 8/2006 | Curello et al. | |
| 2007/0207085 A1 | 9/2007 | Troczynski | |
| 2007/0243431 A1 | 10/2007 | Zhu et al. | |
| 2007/0253875 A1 | 11/2007 | Koripella et al. | |
| 2008/0026269 A1 | 1/2008 | Shurtleff et al. | |
| 2010/0015477 A1 | 1/2010 | McGill | |

APPARATUS, SYSTEM, AND METHOD FOR PRODUCING ENERGY USING A STREAM OF LIQUID ALKALI METAL

CROSS-REFERENCE TO RELATED APPLICATIONS

This application is a continuation in part of, and claims priority to, application Ser. No. 12/173,741 for Bruce McGill, entitled "Apparatus, System, and Method for Producing Energy Using an Alkali Metal" and filed on Jul. 15, 2008, which application is hereby incorporated by reference.

BACKGROUND OF THE INVENTION

1. Field of the Invention

This invention relates to energy production and more specifically relates to production of electricity from the controlled reaction of an alkali metal and water.

2. Description of the Related Art

As energy demand grows, and fossil fuels become increasingly scarce, the demand for alternative energy grows. One alternative energy source currently being pursued is fuel cell technology. Like a battery, a fuel cell is an electrochemical converter that produces electricity at an anode and an oxidant at a cathode. Unlike a battery, fuel cells can operate continuously as long as the fuel is continuously supplied to the fuel cell. Therefore, fuel cells differ from batteries in that they require a fuel to produce the electricity.

Hydrogen is a common fuel source for certain fuel cells. In a hydrogen fuel cell hydrogen gas is used as the fuel and oxygen is used as the oxidant. The product of the fuel cell reaction is water, an extremely environmentally friendly product when compared to emissions produced from the burning of fossil fuels.

As such, it is desirable to develop approaches to generating hydrogen for that will provide necessary fuel for a hydrogen fuel cell. It is also desirable to lose as little energy as possible during the process of generating the hydrogen.

SUMMARY OF THE INVENTION

An apparatus may be configured to produce energy during a hydrogen generation process. In certain embodiments, the apparatus includes a feeder module that conveys a stream of liquid alkali metal to a reaction chamber that contains water. The liquid alkali metal and the water may interact in the reaction chamber. The apparatus may also include a first electrode that is in electrical communication with the stream of liquid alkali metal. The first electrode may be, in certain embodiments, a conducting wire inserted into the liquid alkali metal. The apparatus may also include a second electrode that is in electrical communication with the water that is in the reaction chamber. The second electrode may comprise a noble metal. The second electrode may comprise gold or platinum. The apparatus may also include a terminal that is coupled to the first electrode and to the second electrode.

The apparatus may also comprise a titration module that is situated within the water of the reaction chamber and that receives the stream of liquid alkali metal from the feeder module. The titration module may separate the stream of liquid alkali metal into a plurality of streams of liquid alkali metal. In certain embodiments, the titration module includes a plurality of passageways that separate the stream of liquid alkali metal into a plurality of streams of liquid alkali metal. The passageways may connect the feeder module and the surface of the titration module. The liquid alkali metal may be consumed at the surface of the titration module where the liquid alkali metal interfaces with the water. The second electrode may, in certain embodiments, be situated near to the titration module.

In certain embodiments, the liquid alkali metal is molten sodium. The feeder module may include a feeder tube. The feeder module may also include a heater that heats the liquid alkali metal to a temperature above the melting point of the liquid alkali metal. The feeder module may convey the stream of liquid alkali metal to the reaction chamber at a rate that is selected to control the reaction of the liquid alkali metal with the water.

The terminal may be connected in series with a terminal of a hydrogen fuel cell that receives the hydrogen that is generated in the reaction chamber. The terminal may also include a regulation module that is connected to the first electrode and the second electrode, and that provides a regulated voltage at the terminal.

In certain embodiments, the invention is a system for producing energy that includes a reaction chamber that retains water at a level sufficient to react an alkali metal with the water. The system may also include a heating module that heats the alkali metal to a temperature above the melting point of the alkali metal. This may convert the alkali metal to liquid form. The system may further include a titration module that separates the liquid alkali metal into liquid alkali metal droplets. The alkali metal droplets may be separated at a distance selected to avoid re-association of the alkali metal droplets. The titration module may also control the size of the alkali metal droplets such that the alkali metal droplets completely react with the water before the alkali metal droplets reach the surface of the water.

The system may also include a feeder module that conveys the alkali metal to the reaction chamber at a rate selected to control the reaction of the liquid alkali metal with the water, and a first electrode situated within the liquid alkali metal. The second electrode may be situated within the water in the reaction chamber. A terminal may be coupled to the first electrode and the second electrode. In certain embodiments, the system also includes a fuel cell that uses hydrogen gas created in the reaction chamber as fuel.

The reaction chamber may be configured to circulate water through the reaction chamber. The heating module may maintain the titration module at a temperature above the melting point of the alkali metal. The system may also include a combustion unit that combusts hydrogen gas. In certain embodiments, the terminal is connected in series with the terminal of the fuel cell.

A method for producing energy may also be used. The method may involve conveying a stream of liquid alkali metal to the reaction chamber where the liquid alkali metal interacts with water in the reaction chamber. The method may also include situating a first electrode within the stream of liquid alkali metal, and a second electrode within the reaction chamber. The method may further involve coupling a terminal to the first electrode and the second electrode.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments illustrated in the appended drawings, which depict only typical embodiments of the invention and are not to be considered limiting of its scope, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
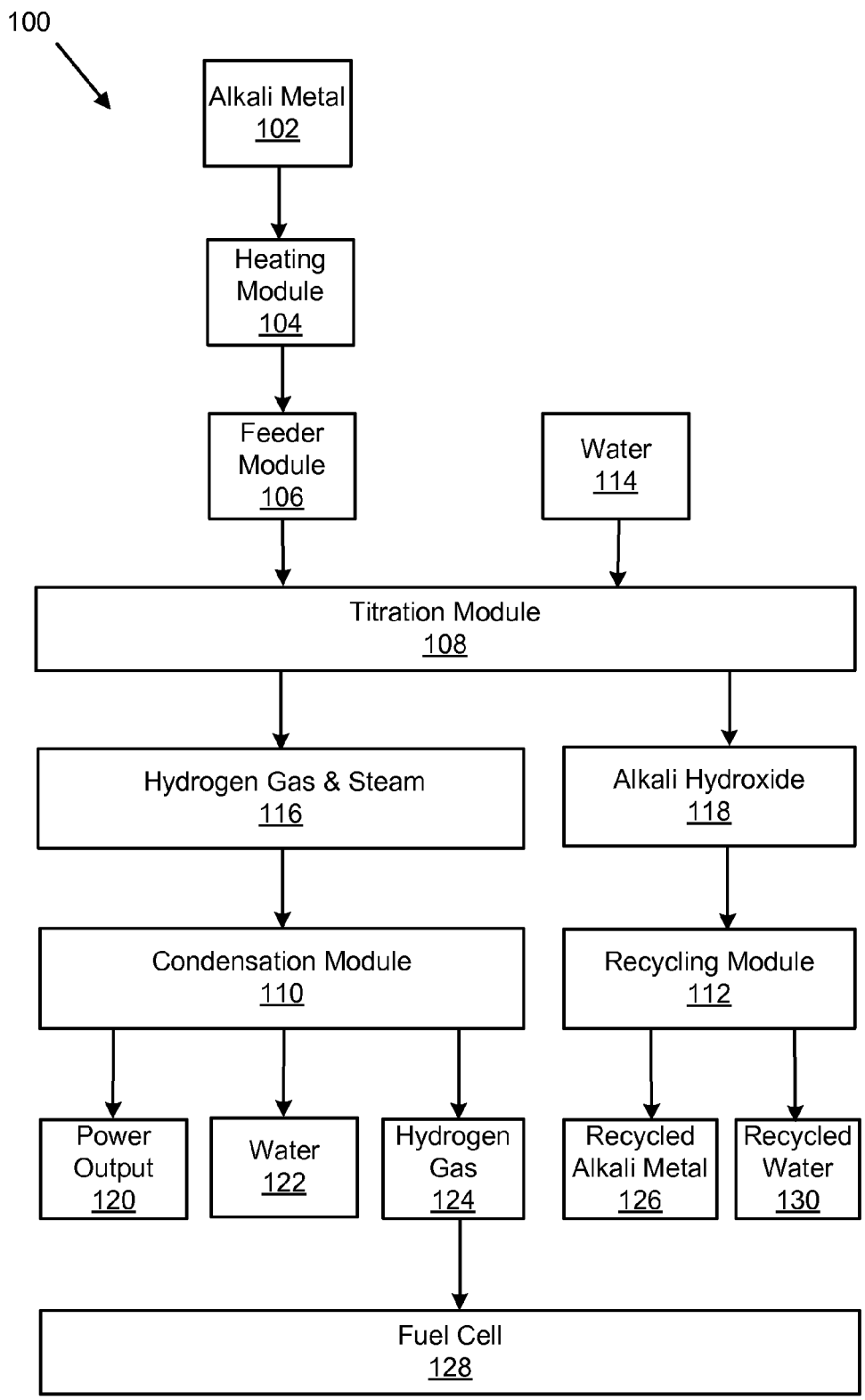
FIG. 1 is a schematic block diagram illustrating one embodiment of a system for producing energy.

FIG. 1 depicts an embodiment of a system 100 for producing energy from the controlled reaction of an alkali metal with water. The system 100 includes an alkali metal 102, a heating module 104, and a feeder module 106. A titration module 108 combines the alkali metal 102 and water 114 to produce hydrogen gas and steam (collectively 116) and alkali hydroxide 118. The system also includes a condensation module 110 which produces a power output 120, water 122 and hydrogen gas 124. In certain embodiments the system 100 also includes a fuel cell which uses the hydrogen gas 124 to produce electricity. A recycling module 112 regenerates recycled alkali metal 126 and recycled water 130. Each of the above identified elements is described below.

In operation the system 100 is configured to control the reaction of an alkali metal with water 114. The alkali metal 102 may comprise any of the alkali metals such as lithium, sodium, potassium, or similar metals. In one embodiment the alkali metal 102 includes a solid sodium metal. In other embodiments the alkali metal 102 is an alkali metal alloy. In certain embodiments a non-alkali metal which reacts with water 114 to produce hydrogen gas 124 may be used with the system 100. In one embodiment the alkali metal 102 may be selected depending on the strength of the reaction or speed of the reaction desired. For instance, francium has the strongest reaction with water and may be selected as the alkali metal 102 for system 100 where a strong reaction is required. Likewise, caesium has the next strongest reaction with water and may be selected as the alkali metal 102 where a reaction that is weaker than a reaction of francium and water is desired. One skilled in the art will recognize that the reaction of an alkali metal with water becomes increasingly violent as one moves down Group 1 in the periodic table. Therefore, it would be within capabilities of a skilled artisan to adjust the strength of the reaction to conform to a desired reaction rate by selecting an appropriate alkali metal or by using an alkali metal alloy of appropriate composition.

In certain embodiments sodium metal may be used as the alkali metal 102. One skilled in the art will recognize that sodium metal has a relatively low melting point and therefore may be used in the system 100 as a liquid metal at relatively low temperatures. Further, sodium metal is abundant and easily obtained at an affordable price making sodium metal an appropriate alkali metal 102 in certain embodiments.

In one embodiment alkali metal 102 is heated by the heating module 104 to a temperature above a melting point of the alkali metal 102. The heating module 104 includes a heating device such as an electric or gas fueled heater configured to heat the alkali metal 102 to a temperature sufficient to soften or melt the alkali metal 102. The alkali metal 102 is heated to a high enough temperature to convert the alkali metal 102 into a liquid alkali metal. For example, where the alkali metal 102 is sodium, the heating module 104 may be configured to heat the sodium to a temperature above 370.87 K, the melting point of sodium. In one embodiment the pressure of the heating module 104 may be adjusted to vary or lessen the temperature required to melt the alkali metal 102. For example, when sodium is pressurized to 3000 pounds of pressure, the sodium becomes liquid at room temperature. Therefore, to reduce the heat required to melt the sodium metal 102 the pressure may be increased in the heating module 104.

In certain embodiments it may be advantageous to keep the alkali metal 102 in a semi-solid state. In such embodiments the alkali metal 102 may be heated to a temperature below the melting point of the alkali metal 102 but sufficient to soften the alkali metal 102 to manipulate the softened alkali metal 102 through a feeder module 106, a filter or at least one capillary tube as further discussed below. In one embodiment the heating module 104 may be a flame or other heat source configured to directly heat the alkali metal 102. In another embodiment the heating module 104 may be a heat exchanger configured to transfer heat to the alkali metal 102 without direct contact between the heat source and the alkali metal 102.

The feeder module 106 is configured to convey the alkali metal 102 to the titration module 108. In certain embodiments the feeder module 106 delivers the alkali metal 102 to the titration module 108 under pressure. The pressure of the alkali metal 102 delivered by the feeder module 106 may be selected to control a rate of a chemical reaction between the alkali metal 102 and water 114. In certain embodiments the feeder module 106 may be arranged such that it conveys the alkali metal 102 to the heating module 104 before conveying the alkali metal 102 to the titration module 108. In another embodiment the feeder module 106 is arranged such that it conveys the alkali metal 102 from the heating module 104 to the titration module 108.

As discussed above, the alkali metal 102 may be heated by the heating module 104 to a temperature above the melting point of the alkali metal 102 to convert the alkali metal 102 to a liquid form for easy manipulation of the alkali metal 102. In certain embodiments the feeder module 104 may comprise a pump and a feeder tube. Once the alkali metal 104 is heated above the melting temperature of the alkali metal 102, the pump pumps the liquid alkali metal 102 through the feeder tube and into the titration module 108. One skilled in the art will recognized that other methods of delivering the alkali metal 102 to the titration module 108 may be utilized such as gravity or mechanical delivery. In certain embodiments the heated liquid alkali metal 102 is contained within another vessel. The separate vessel containing the pressurized liquid alkali metal 102 may be connected to the titration module 108 such that the pressure of the separate vessel containing the liquid alkali metal 102 forces the liquid alkali metal through a feeder tube and into the titration module 108. The rate at which the alkali metal 102 is conveyed into the titration module 108 may be controlled to control the rate of the alkali metal 102 and water 114 reaction.

Of course, one skilled in the art will recognize that in certain embodiments the system 100 may not include a feeder module 104 or feeder tube. Instead, in certain embodiments the alkali metal 102 may be heated at a position directly adjacent to the titration module 108 and forced through the filter. In one embodiment the alkali metal 102 may be heated at a point above the titration module 108 and gravity may deliver the liquid alkali metal 102 to the titration module 108.

In certain embodiments the feeder module 106 is also configured to deliver water 114 to the titration module 108 at a rate selected to control the rate of the chemical reaction between the alkali metal 102 and water 114. In certain embodiments the water 114 may be delivered to the titration module 108 at or above its boiling temperature. In one embodiment the feeder module 106 may include a second pump and a second tube configured to deliver the water 114 to the titration module 108. By limiting the alkali metal 102 reactant or the water 114, or both, the rate of the reaction of the alkali metal 102 and water 114 can be controlled.

The titration module 108 receives the heated alkali metal 102 from the feeder module 106. In certain embodiments the titration module 108 includes a filter, such as a ceramic, metallic, or other filter, configured to separate the alkali metal 102 into alkali metal droplets. Where the filter includes a metallic filter, the filter material may be selected such that the filter includes a metal impervious to the hydroxyl ion to avoid corrosion of the filter. Similarly, other components of the system 100 may be selected to incorporate a material impervious to the hydroxyl ion to avoid corrosion of each component.

The feeder module 106 delivers the soft or liquid alkali metal 102 to the titration module 108 at a pressure that is sufficient to force the alkali metal 102 through the filter. By forcing the alkali metal 102 through the filter, the alkali metal 102 is separated into alkali metal droplets. The porosity of the filter may be controlled to adjust the size of the alkali metal droplets as well as the spacing between the alkali metal droplets as the alkali metal 102 exits the filter as alkali metal droplets. Adjusting the size and spacing of the alkali metal droplets results in larger or smaller alkali metal droplets dispersed throughout the titration module 108. Ideally the alkali metal droplets are uniformly dispersed throughout the titration module 108. Further, re-association of the alkali metal droplets may be avoided by maintaining a sufficient distance between the alkali metal droplets.

By adjusting the size of the alkali metal droplet the reaction between the alkali metal 102 and the water 114 may be controlled such that the alkali metal droplets are completely reduced to an alkaline hydroxide 118 before they reach the surface of the water 114. In certain embodiments the size of each alkali metal droplet may be selected such that the alkali metal droplet are completely reduced to an alkaline hydroxide 118 within about 1 to 2 centimeters from the surface of the water 114. In one embodiment the size of each alkali metal droplet may be selected such that the alkali metal droplet are completely reduced to an alkaline hydroxide 118 by the time they reach the surface of the water 114. One skilled in the art will recognize that in certain embodiments the size of the alkali metal droplets may be selected to assure that the alkali metal droplets are completely reduced at a distance more than 2 centimeters from the surface of the water 114. This may be particularly useful where the size of each individual alkali metal droplet varies such that they are reduced at different levels within the reaction chamber. In other embodiments the size of the alkali metal droplets may be varied to allow acceptable number of alkali metal droplets to reach the surface of the water 114.

In one embodiment the titration module 108 includes at least one capillary tube selected to separate the alkali metal 102 into alkali metal droplets. The capillary tubes are positioned to separate the alkali metal droplets at a sufficient distance to avoid re-association of the alkali metal 102. In certain embodiments the capillary tubes may be used instead of the filter. In one embodiment the capillary tubes may be used in conjunction with the filter such that the liquid alkali metal may first be forced through the filter and then through a capillary tube to further disperse the alkali metal droplets. In yet another embodiment the liquid alkali metal is first forced through the capillary tube and then through the filter. In another embodiment the alkali metal 102 is forced through a filter and capillary tubes in certain areas of the filter and through the filter alone in other areas of the filter such that some of the alkali metal droplets come directly from the filter and other alkali metal droplets come through the filter and then through capillary tubes.

In certain embodiments the water 114 entering the titration module 108 may be heated to a temperature just below boiling prior to entering the titration module 108. In one embodiment the water 114 may be heated to a temperature above the boiling point of water prior to entering the titration module 108. In other embodiments the titration module 108 itself may include a heating device configured to heat the water 114. For example, in one embodiment the filter or capillary tubes may be heated such that the alkali metal 102 remains liquid within the filter or capillary tubes. In other embodiments the water 114 may be heated by the heat of the reaction of the alkali metal 102 and water 114 such that external or additional heating may be unnecessary. In another embodiment a small amount of sodium metal may be directly delivered to the titration module 108 to preheat heat the water 114 before pumping the liquid sodium metal 102 through the filter or capillary tubes.

By heating the water 114, the alkali metal 102 remains liquid so that it will not solidify in the filter or capillary tubes. Additionally, by heating the water 114 to a temperature close to boiling, the reaction within the titration module 108 does not need to heat the water 114 a lot to produce steam which can be utilized to produce power. In certain embodiments where the heat energy of the steam will not be captured or utilized it may be unnecessary to heat the water 114 prior to the introduction of the alkali metal 102. Further, in certain embodiments the heat produced by the reaction of the water 114 and the alkali metal 102 may be utilized to heat the water 114.

The controlled reaction of the alkali metal 102 and the water 114 results in the following reaction: Alkali metal+water→Alkali metal hydroxide+hydrogen gas+heat. Thus, products of the reaction includes hydrogen gas and steam (collectively 116) and alkaline hydroxide 118.

In certain embodiments the hydrogen gas and steam 116 are sent through a turbine in the condensation module 110 to produce power 120 and separate the water 122 from the hydrogen gas 124. In one embodiment the turbine is connected to a generator to produce an electrical current as the power output 120. In another embodiment the turbine is configured to provide a mechanical force as the power output 120 such as with a steam engine or other steam powered device. In one embodiment the power output 120 may include heat for heating other devices or systems.

As stated above, the reaction of the alkali metal 102 and water 114 produces hydrogen gas and steam 116. To separate the hydrogen gas 124 from the steam the steam is cooled and condensed to produce water 122. The water 122 may then be removed leaving the hydrogen gas 124. In one embodiment the steam may be partially cooled and removed as water 122, leaving a water rich hydrogen gas 125 which may then be used as a fuel source in a fuel cell 128. In another embodiment the amount of water 122 removed from the mixture of hydrogen gas and steam 116 is dependent on the use to which the hydrogen gas 124 will be put. For example, where the hydrogen gas 124 is combusted to produce heat, virtually all of the water 122 may be removed from the hydrogen gas and steam mixture 116. In one embodiment the hydrogen gas 128 may be used in an internal combustion engine or other device or system which requires a combustible fuel source.

In one embodiment the fuel cell 128 includes an electrochemical conversion device that converts the hydrogen gas 124 produced by the titration module 108 and oxygen into water and in the process produces electricity. In certain embodiments the supply of the alkali metal 102 and water 114 in the titration module 108 may be controlled to provide a continuous supply of hydrogen gas 124 to the fuel cell 128. The fuel cell 128 may include a polymer exchange membrane fuel cell ("PEMFC"), a solid oxide fuel cell ("SOFC"), an alkaline fuel cell ("AFC"), a molten-carbonate fuel cell ("MCFC"), a phosphoric-acid fuel cell ("PAFC"), a direct-methanol fuel cell ("DMFC") or other type of fuel cell as is known in the art.

As the reaction between the alkali metal 102 and water 114 progresses within the titration module 108 alkaline hydroxide 118 is produced. The reaction between the alkali metal 102 and water 114 slows as the reaction approaches equilibrium, that is, as the alkaline hydroxide 118 concentration increases the reaction slows. If the reaction between the alkali metal 102 and water 114 is allowed to progress all the way to equilibrium with the alkaline hydroxide 118 the reaction will stop. Therefore, to maintain a forward reaction between the alkali metal 102 and water 114 the recycling module 112 may be configured to remove the alkaline hydroxide 118 from the titration module 108. The rate at which the recycling module 112 removes the alkaline hydroxide 118 from the titration module 108 may be adjusted to maintain a forward reaction between the alkali metal 102 and water 114. In certain embodiments the rate at which the alkaline hydroxide 118 is removed from the titration module 108 may be varied according to the hydrogen gas 124 requirements or the power output 120 requirements of the system 100.

Once the alkaline hydroxide 118 is removed from the titration module 108, the alkaline hydroxide 118 is dried by the recycling module 112. In certain embodiments the alkaline hydroxide 118 is dried by adding alkali metal to the alkaline hydroxide 118 to solidify the alkaline hydroxide 118. In one embodiment the dried alkaline hydroxide 118 may be removed from the recycling module 112 for disposal or further processing in a separate system. In certain embodiments the recycling module 112 is further configured to regenerate the alkaline hydroxide 118 to produce a recycled alkali metal 126 and recycled water 130. The dried alkaline hydroxide 118 is heated to a temperature sufficient to fuse the alkaline hydroxide 118. For example, sodium hydroxide has a melting point of 591.15 K. Below 591.15 K, sodium hydroxide may not be efficiently reduced to sodium metal and water. Therefore, in certain embodiments it may be necessary to heat the sodium hydroxide to 591.15 K. Similarly, other alkali metals may be heated to a temperature above their respective melting points. In one embodiment, the heat produced by the alkali metal 102 and water 114 reaction may be utilized to heat the alkaline hydroxide 118 to a sufficient temperature for the electrolysis reaction of the alkaline hydroxide 118.

The recycling module 112 recycles the alkaline hydroxide 118 by electrolysis such that the alkaline hydroxide 118 is reduced to a recycled alkali metal 126 recycled water 130 and oxygen. For example, in one embodiment sodium hydroxide may be reduced to sodium metal according to the following chemical reaction $4NaOH+4e^- \rightarrow 4Na+2H_2O+O_2$. In certain embodiments the recycling module 112 includes electrodes that provide the electrical current necessary to reduce the alkaline hydroxide 118 to the recycled alkali metal 126. In certain embodiments the electrical current may be generated by a generator connected to a turbine. In another embodiment the electrical current may include an external source of electricity. Once the alkaline hydroxide 118 has been reduced to the recycled alkali metal 126 and the recycled water 130 the recycled alkali metal 126 and the recycled water 130 may be used as the reactant alkali metal 102 and reactant water 114 to reduce or eliminate waste in the system 100.

Figure 2:
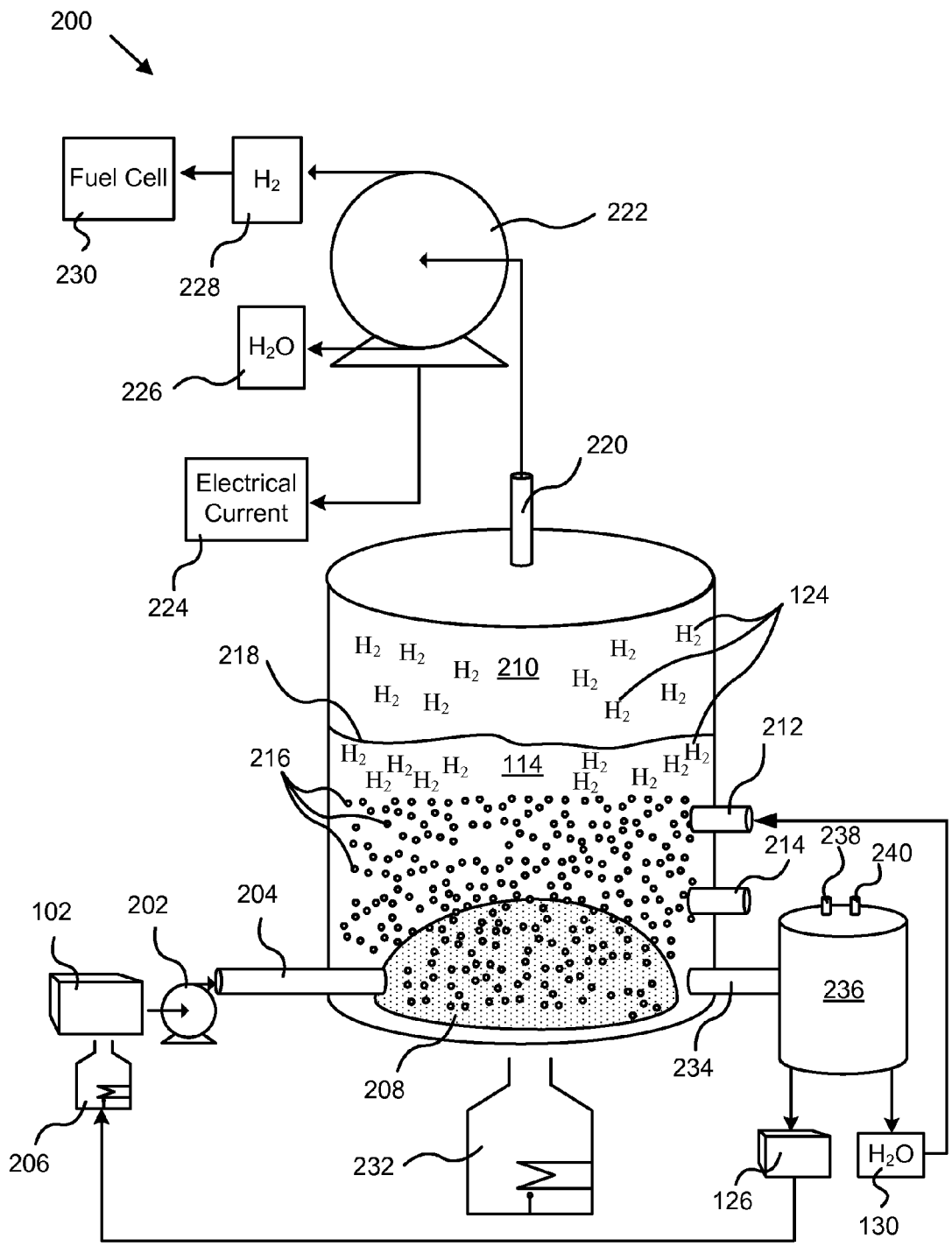
FIG. 2 is a functional block diagram illustrating one embodiment of an apparatus for producing energy.

FIG. 2 illustrate an embodiment of an apparatus 200 for producing energy from the controlled reaction of an alkali metal with water. As further discussed below, the apparatus 200 includes an alkali metal feeder pump 202 connected to one end of a feeder tube 204, a filter 208 connected to the other end of the feeder tube 204, a reaction chamber 210 with a water inlet 212 and a water outlet 214, an extraction port 220, a reaction chamber heater 232, a recycling chamber 236 connected to the reaction chamber by a alkaline hydroxide removal tube 234, a condensation module 222 and a fuel cell 230.

A heater 206 for heating alkali metal is connected to the input of the feeder pump 202 and provides a heat source to heat melt the alkali metal 102. The output of the feeder pump 202 is connected to the feeder tube 204 at one end of the feeder tube 204. A filter 208 is disposed within a reaction chamber 210 and connected to the other end of the feeder tube 204.

A water inlet 212 and a water outlet 214 are configured to maintain the water 114 within the reaction chamber 210 at a level selected to fully reduce the alkali metal 102 to an alkaline hydroxide 118 and hydrogen gas 124 before the alkali metal 102 reaches the surface 218 of the water 114. In certain embodiments the apparatus 200 may further include a water pump (not shown) configured to pump the water 114 through the reaction chamber 210 at a rate selected to assure a forward reaction between the alkali metal 102 and alkaline hydroxide 118.

The alkali metal 102 is heated by the heater 206 to a temperature above the melting point of the alkali metal 102 such that the alkali metal 102 is liquefied. The feeder pump 202 pumps the liquefied alkali metal 102 through the feeder tube 204 and through the filter 208. The filter 208 includes fine openings which separates the liquid alkali metal into alkali metal droplets 216. The fine openings disposed within the filter 208 are separated at a sufficient distance to avoid re-association of the alkali metal 102. The fine openings disposed within the filter 208 have a diameter that produces an alkali metal droplet 216 which is proportioned such that the alkali metal droplet 216 is completely reduced to an alkaline hydroxide 118 before the alkali metal droplet 216 reaches the surface 218 of the water 114. As the alkali metal 102 is converted to alkaline hydroxide 118 hydrogen gas 124 is produced.

In certain embodiments the liquid alkali metal 102 may solidify if it is not continuously heated. Once the liquid alkali metal 102 solidifies it may clog the filter 208. Therefore, in one embodiment the reaction chamber 210 may be heated by a reaction chamber heater 232. In another embodiment the filter 208 may be heated to maintain a liquid alkali metal 102. In another embodiment the feeder tube 204 may be heated to maintain the alkali metal 102 in a liquid state. In yet another embodiment the feeder tube 204 may be insulated to avoid heat loss as the liquid alkali metal 102 is pumped from the heater 206 to the filter 208.

The reaction of the alkali metal 102 with the water 114 also produces heat and steam which increases pressure within the reaction chamber 210 due to the expansion of the water molecules as the water 114 is converted from a liquid to a gaseous state. In certain embodiments the reaction chamber 210 may include a closed unit configured to withstand the increased pressure. An extraction port 220 provides a release mechanism through which the pressurized steam and hydrogen gas 124 may be removed from the reaction chamber 210. The pressurized steam is forced through a turbine in the condensation module 222 to turn the turbine.

In certain embodiments the condensation module 222 is connected to a generator which produces an electrical current 224. As the steam cools and condense into water 226 the water 226 and hydrogen gas 228 can be separated by draining the water 226 from the turbine 222. In certain embodiments the water 226 may be recycled as the reactant water 114. The separated hydrogen gas 228 may be used in a fuel cell 230 or may be burned as a fuel for a combustion engine, or other heat requiring device. Similarly, the hydrogen gas 228 may be removed and stored in a separate storage container for later use.

As the alkali metal 102 and water 114 react alkaline hydroxide 118 begins to accumulate in the reaction chamber 210. The alkaline hydroxide 118 is removed through an alkaline hydroxide removal tube 234. In certain embodiments a pump may assist in the removal of the alkaline hydroxide 118. The alkaline hydroxide 118 is recycled at the recycling chamber 236 by drying the alkaline hydroxide 118, heating the alkaline hydroxide 118 to a temperature sufficient to fuse the alkaline hydroxide 118 and running an electrical current through an anode 238 and a cathode 240 to reduce the alkaline hydroxide 118 to a recycled alkali metal 126 and recycled water 130.

Figure 3:
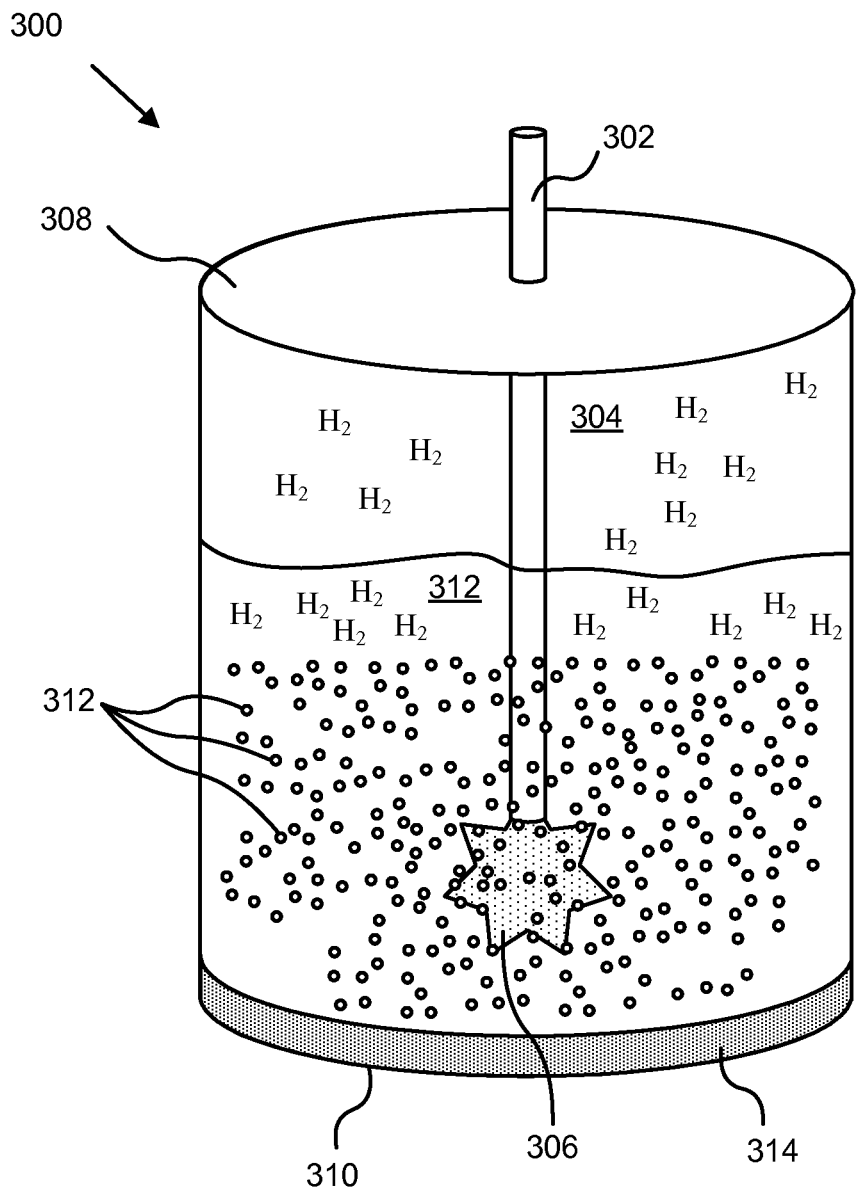
FIG. 3 is a functional block diagram illustrating one embodiment of a star shaped filter disposed within a reaction chamber.

FIG. 3 illustrates another embodiment of an apparatus 300 for producing energy from the controlled reaction of an alkali metal with water. In the embodiment illustrated in FIG. 3 the feeder tube 302 is disposed through the top 308 of the reaction chamber 304. One skilled in the art will recognize that in certain embodiments the feeder tube 302 may be disposed through the side of the reaction chamber 302 similar to the embodiment illustrated in FIG. 2. Additionally, one skilled in the art will recognize that in certain embodiments the feeder tube 302 may be disposed through the bottom of the reaction chamber 302 similar to the embodiment illustrated in FIG. 4. The filter 306 connected to the end of the feeder tube 302 that is disposed within the reaction chamber 304. In certain embodiments the filter 306 positioned within the reaction chamber 304 at a distance above the bottom of the reaction chamber 310. The distance above the bottom 310 of the reaction chamber 304 that the filter 306 is placed may be selected to allow the alkali metal 102 to evenly flow through the filter 306 around the entire surface of filter 306.

The shape of the filter 306 may be selected to assure even spacing of the alkali metal droplets 312 to avoid the re-association of the alkali metal droplets 312 within the reaction chamber 304. For example, the illustrated embodiment shows a star shaped filter 306. In other embodiments the filter 306 may include a sphere, a toroid, a triangle, a diamond, a pyramid or other shape selected to separate the alkali metal droplets 312.

As the alkali metal droplets 312 react with the water 312 contained within the reaction chamber 304, alkaline hydroxide 314 may precipitate from the solution near the bottom 310 of the reaction chamber 304. As discussed in relation to FIG. 2, the alkaline hydroxide 314 may be removed from the reaction chamber 304 through an alkaline hydroxide removal tube such as the alkaline hydroxide removal tube 234 of FIG. 2. In one embodiment the alkaline hydroxide 314 may be physically removed from the reaction chamber 304 via a removal tool such as a shovel or other scooping device.

Figure 4:
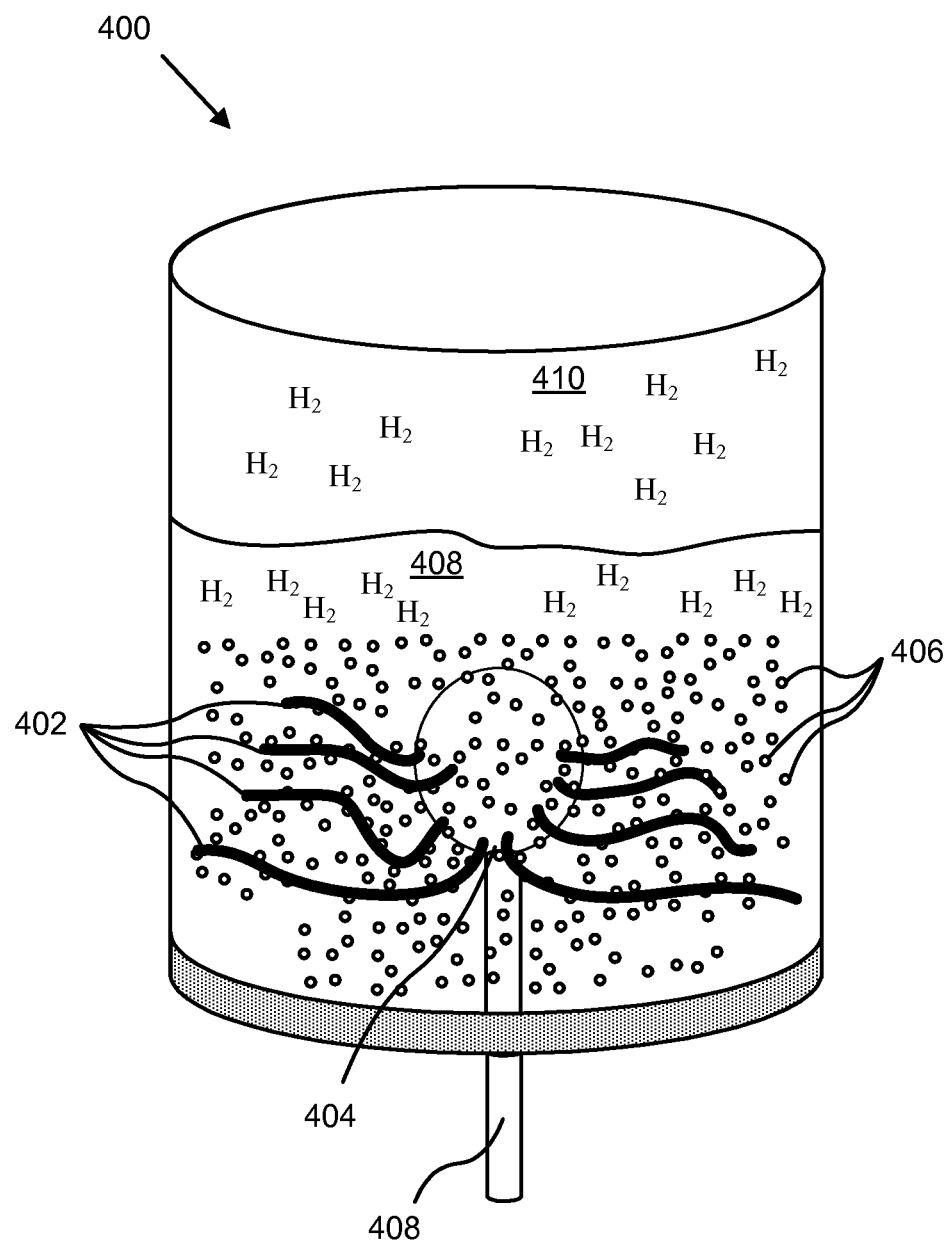
FIG. 4 is a functional block diagram illustrating one embodiment of a spherical filter with capillary tubes.

FIG. 4 illustrates another embodiment of an apparatus 400 for producing energy from the controlled reaction of an alkali metal with water. In certain embodiments capillary tubes 402 may be attached to the filter 404. The length of each individual capillary tube 402 may be selected to space the alkali metal droplets 406 far enough apart to avoid re-association of the alkali metal droplets 406. In certain embodiments the lower capillary tubes 402 may be longer than upper capillary tubes 406 so that the alkali metal droplets 406 do not run into each other as they rise through the water 408 within the reaction chamber 410. In certain embodiments the capillary tubes 402 include a rigid material such that each capillary tube 402 does not move. In one embodiment the capillary tubes 402 include a flexible material such that each capillary tube 402 is free to move about the reaction chamber 410. As discussed above, in certain embodiments the feeder tube 408 may be disposed through the bottom of the reaction chamber 410.

Figure 5:
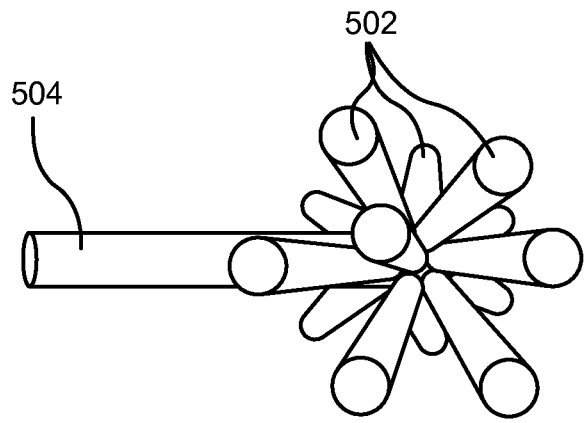
FIG. 5 is a perspective view illustrating one embodiment of capillary tubes disposed around a feeder tube.

FIG. 5 illustrates a plurality of capillary tubes 502 connected to a feeder tube 504 according to one embodiment of the current invention. In one embodiment the capillary tubes 502 may be directly connected to the feeder tube 504 without a filter disposed between the capillary tubes 502 and the feeder tube 504. The inner diameter of the capillary tubes 502 is sized to create a small enough alkali metal droplet that the alkali metal droplet is completely reduced to an alkaline hydroxide before the alkali metal droplet reaches the surface of the water. As discussed above, the capillary tubes 502 may be rigid or flexible and the ends of the capillary tubes 502 may be space far enough apart that the alkali metal droplets do not come in contact with one another and re-associate. The capillary tubes 502 may include a predetermined pattern in one embodiment. In other embodiments the capillary tubes 502 may be randomly disposed around the feeder tube 504.

Figure 6:
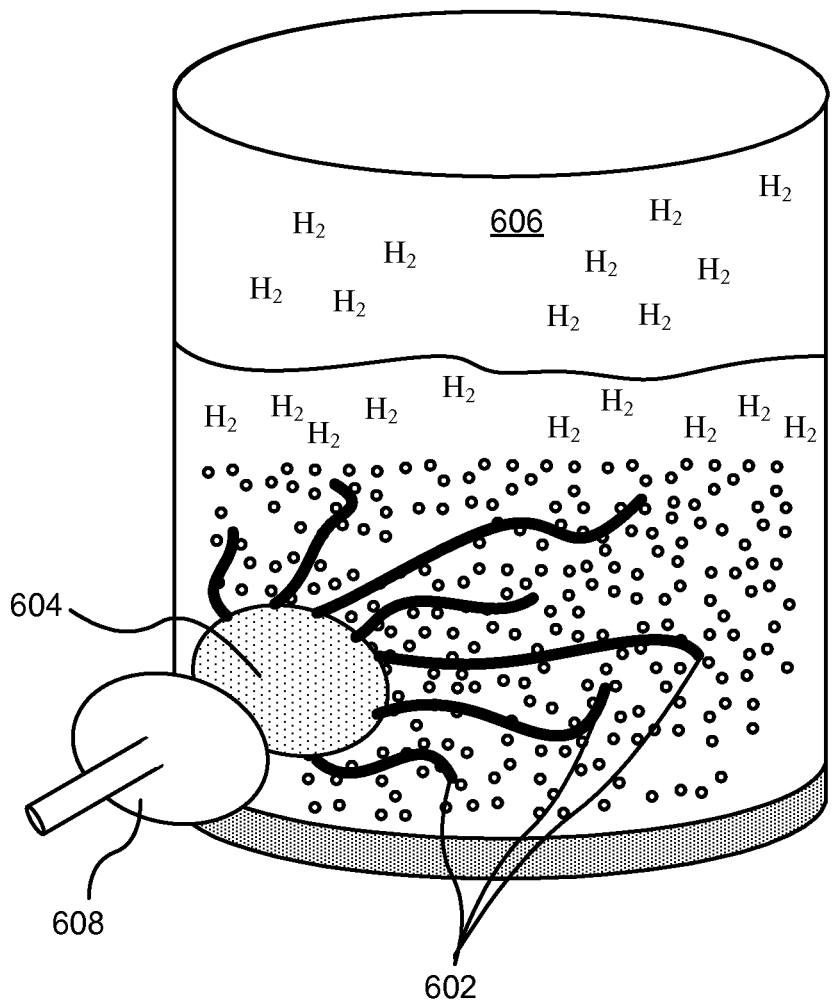
FIG. 6 is a functional block diagram illustrating filter and capillary tubes attached to the side of a reaction chamber.

FIG. 6 illustrates a plurality of capillary tubes 602 connected to a filter 604 disposed on a wall of the reaction chamber 606 according to one embodiment of the current invention. In certain embodiments where the filter 604 is disposed on a wall of the reaction chamber 606 it may be unnecessary to include a feeder tube to transport the liquid alkali metal to the reaction chamber 606. For example, in certain embodiment a heater may heat the alkali metal at a point directly adjacent to the wall of the reaction chamber 606. In one embodiment a plunger 608 is configured to force the liquid alkali metal through the filter 604 and capillary tubes 602.

Figure 7:
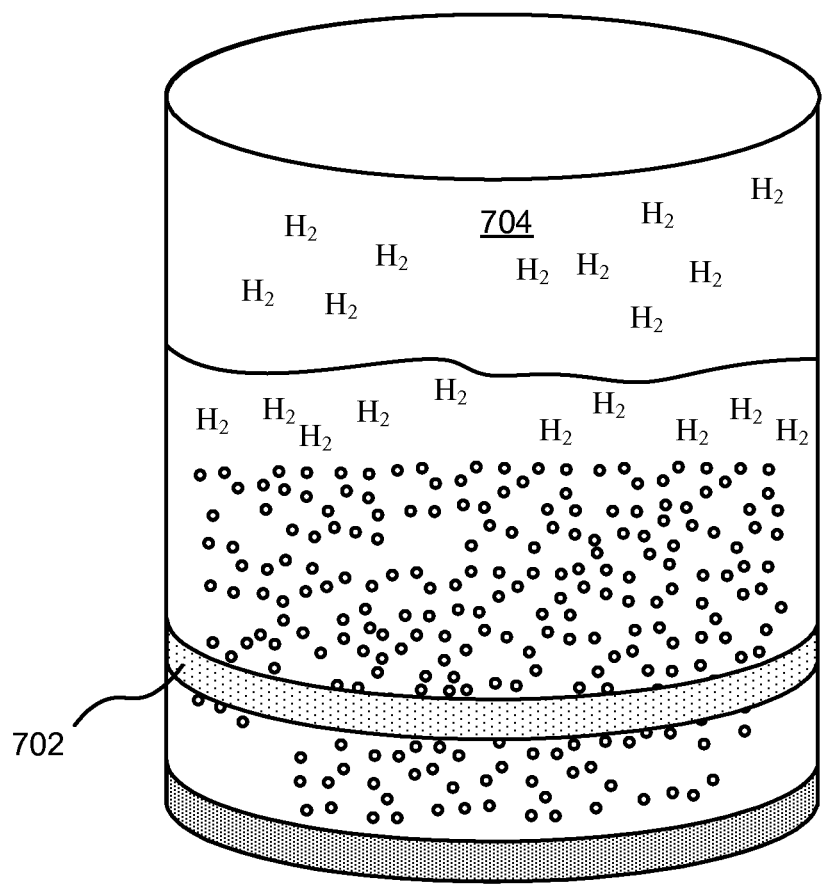
FIG. 7 is a functional block diagram illustrating one embodiment of a filter disposed around the periphery of a reaction chamber.

FIG. 7 illustrates one embodiment of the current invention in which a filter 702 is disposed around the periphery of the reaction chamber 704. In certain embodiments the filter 702 completely surrounds the periphery of the reaction chamber 704. In one embodiment the filter 702 only partially surrounds the reaction chamber 704. One skilled in the art will recognize that the size filter 702 may be configured according to the hydrogen gas requirements or heat requirements of the system.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
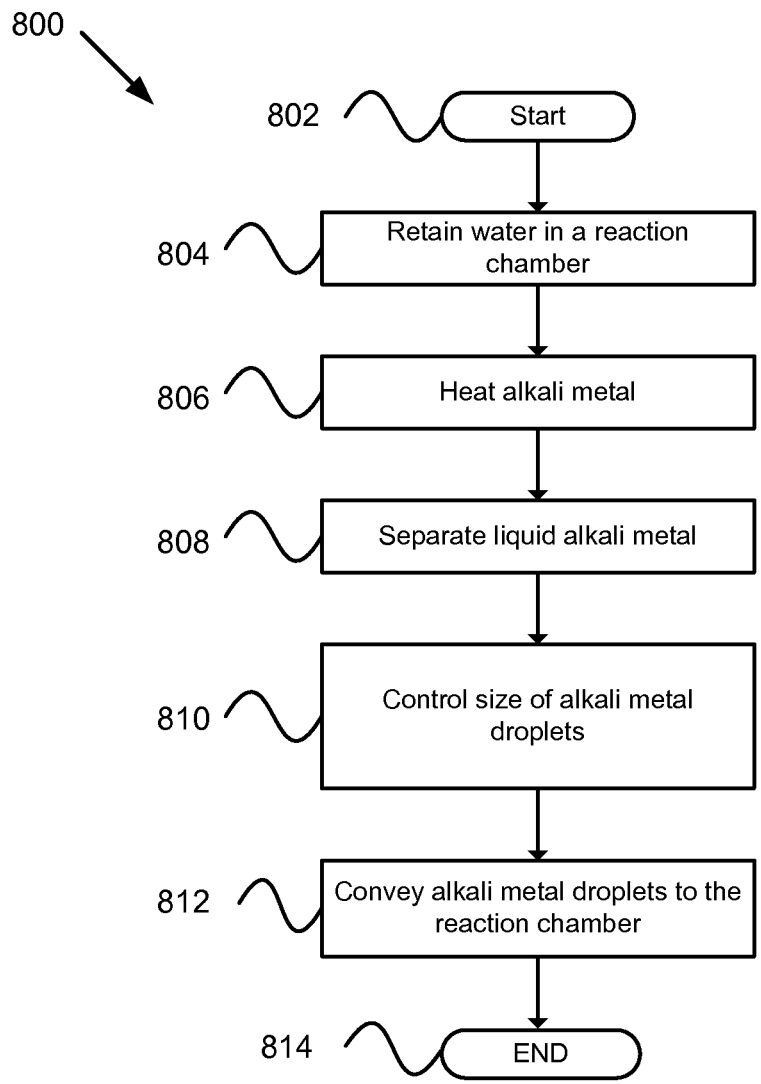
FIG. 8 is a schematic flow chart illustrating one embodiment of a method for producing energy.

FIG. 8 is a schematic flow chart diagram illustrating one embodiment of a method 800 for producing energy from the controlled reaction of an alkali metal and water. In one embodiment the method 800 starts 802 and water is retained 804 in a reaction chamber such as reaction chambers 210, 304, 410, 606 and/or 704. An alkali metal is heated 806 to a temperature above the melting point of the alkali metal converting the alkali metal to a liquid form. The liquid alkali metal is separated 808 into alkali metal droplets. The alkali metal droplets are separated at a distance selected to avoid the re-association of the alkali metal droplets. The sizes of the alkali metal droplets are controlled 810 to make sure that the alkali metal droplets are completely reduced to an alkaline hydroxide within the reaction chamber before the alkali metal droplets reach the surface of the water in the reaction chamber. The alkali metal droplets are conveyed 812 to the reaction chamber at a rate selected to control the reaction between the alkali metal and the water and the method ends 814.

Figure 9:
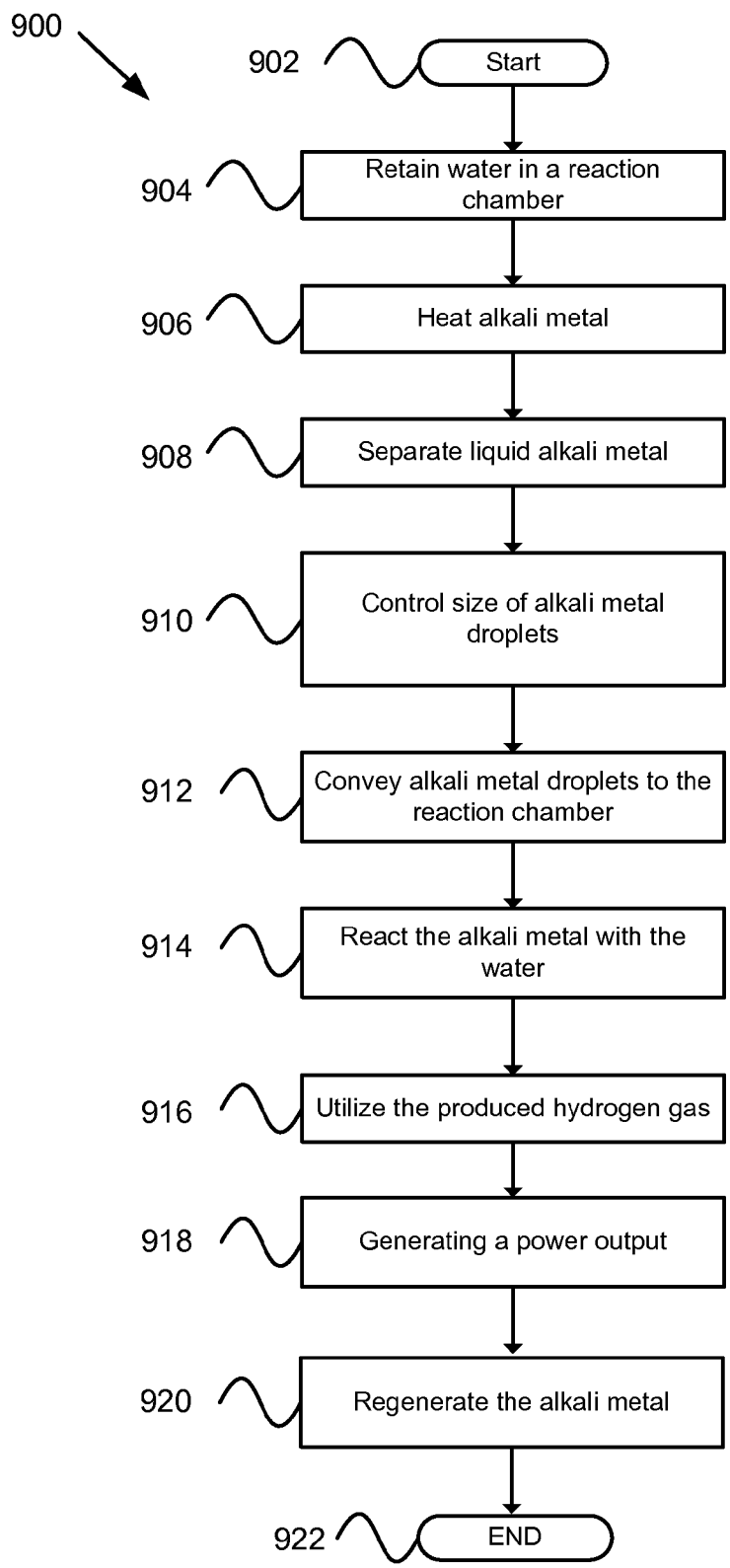
FIG. 9 is a schematic flow chart illustrating another embodiment of a method for producing energy.

FIG. 9 is a schematic flow chart diagram illustrating another embodiment of a method 900 for producing energy from the controlled reaction of an alkali metal and water. Elements 902, 904, 906, 908, 910 and 912 of method 900 may be substantially similar to elements 802, 804, 806, 808, 810 and 812 of method 800 respectively. In one embodiment the method 900 starts 902 and water is retained 904 in a reaction chamber such as reaction chambers 210, 304, 410, 606 and/or 704. An alkali metal is heated 906 to a temperature above the melting point of the alkali metal converting the alkali metal to a liquid form. The liquid alkali metal is separated 908 into alkali metal droplets. The alkali metal droplets are separated at a distance selected to avoid the re-association of the alkali metal droplets. The sizes of the alkali metal droplets are controlled 910 to make sure that the alkali metal droplets are completely reduced to an alkaline hydroxide within the reaction chamber before the alkali metal droplets reaches the surface of the water in the reaction chamber. The alkali metal droplets are conveyed 912 to the reaction chamber at a rate selected to control the reaction between the alkali metal and the water. The alkali metal and water are reacted 914 to produce heat, steam, hydrogen gas and an alkaline hydroxide. The energy potential of the produced hydrogen gas is utilized 916. In certain embodiments the energy potential of the produced hydrogen gas is utilized 916 by burning the produced hydrogen gas. In another embodiment the energy potential of the produced hydrogen gas is utilized 916 in a fuel cell. A power output is also generated 918 in method 900. In one embodiment the power output includes an electrical current produced by a generator. In another embodiment the power output includes a steam powered force created by a turbine. An alkali metal and water is regenerated 920 by electrolysis and the method 900 ends 922. In certain embodiments the regenerated alkali metal and water are recycled and used as the starting reactants for the system 100.

Figure 10:
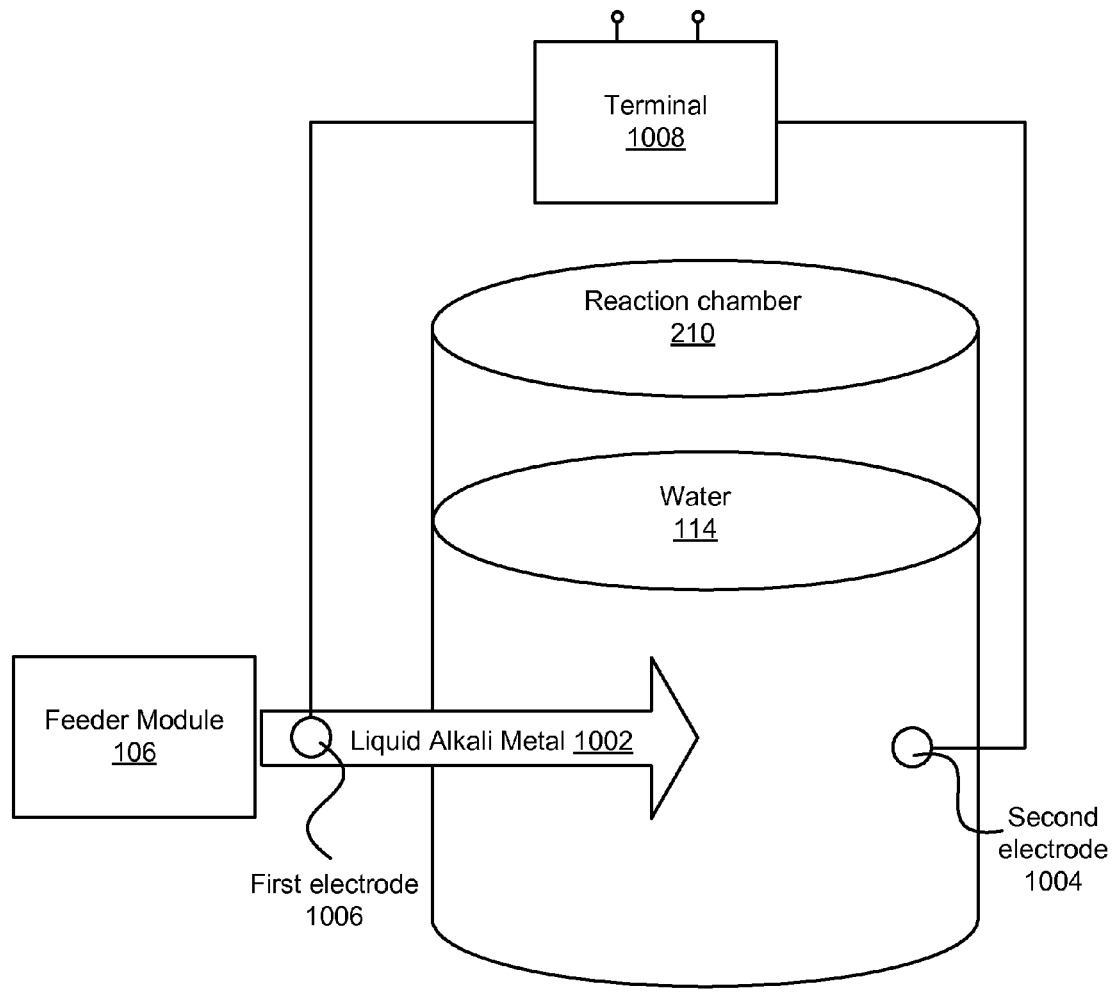
FIG. 10 is a functional block diagram illustrating one embodiment of an apparatus for producing electrical energy as part of a hydrogen generation process.

FIG. 10 shows one embodiment of a system that includes a reaction chamber 210 with water 114, a feeder module 106, a first electrode 1006 within a stream of liquid alkali metal 1002, a second electrode 1004, and a terminal 1008. As seen in the preceding figures, the system may include various other components which are not shown here for simplicity. As discussed above, the term feeder module 106 provides alkali metal 106 to the reaction chamber 210, and may include one or more components for doing so. The feeder module 106, in certain embodiments, may include one or more pumps, tubes, chambers, and other components necessary to provide an alkali metal 104 to the reaction chamber 210. In one embodiment, the feeder module 106 conveys a stream of liquid alkali metal 1002 to the reaction chamber 210, where the liquid alkali metal 1002 interacts with the water 114 in the reaction chamber 210. In certain embodiments, the feeder module 106 works in conjunction with a heater 206 to ensure that the liquid alkali metal 1002 remains a liquid.

An electrode, as used herein, refers to a conductor through which a current either enters or leaves. The electrode may be a cathode or an anode. When this application refers to an electrode being in electrical communication with a particular material, this means that electrons may flow to (or from) the particular material to (or from) the electrode.

In certain embodiments, a first electrode 1006 is in electrical communication with the stream of liquid alkali metal 1002. In one embodiment, the first electrode 1006 is situated within the stream of liquid alkali metal 1002 and is thus in electrical communication with the stream of liquid alkali metal 1002. For example, a conducting wire may be inserted into the stream of liquid alkali metal 1002. The first electrode 1006 is made of a material that can withstand the temperatures and other environmental conditions associated with being in electrical communication with the stream of liquid alkali metal 1002. In one embodiment, the liquid alkali metal 1002 is sodium and the first electrode 1006 is a copper wire inserted into the stream of liquid alkali metal 1002. The first electrode 1006 may also be made of silver, copper, gold, platinum, or other strong conductor that has a melting point that is sufficiently above the temperature of the stream of liquid alkali metal 1002. In other embodiments, the first electrode 1006 is a band built into the interior wall of the feeder tube 204 that conveys the liquid alkali metal 1002 to the reaction chamber 210. Those of skill in the art will appreciate other ways of selecting an appropriate material and configuration for a first electrode 1006 and putting the first electrode 1006 in electrical communication with the liquid alkali metal 1002.

The second electrode 1004 may be in electrical communication with the water 114 in the reaction chamber 210. In one embodiment, the second electrode 1004 is placed in electrical communication with the water 114 by being situated within the water 114. The second electrode 1004 may be made of a material with a lower electrochemical energy than that of the liquid alkali metal 1002. The second electrode may, for example, be made out of copper or zinc when the liquid alkali metal 1002 is molten sodium. In certain embodiments, the second electrode 1004 is made substantially of a noble metal. The noble metals include ruthenium, rhodium, palladium, silver, osmium, iridium, platinum, and gold. In certain embodiments, the second electrode 1004 is made substantially of either gold or platinum. While the second electrode 1004 may comprise a noble metal, some impurities may exist in the second electrode 1004. In one embodiment, the second electrode is made of sintered carbon. In such an embodiment, oxygen and/or air may be forced through the porous carbon cells where it reacts directly with the hydrogen. An electromotive force (emf) is produced with this oxidation-reduction (redox) reaction.

FIG. 10 also shows a terminal 1008 coupled to the first electrode 1006 and the second electrode 1004. The term "coupled" is used to indicate that there may be intermediate components between the first electrode 1006 and/or the second electrode 1004 and the terminal 1008. A terminal 1008 is a location at which a conductor from an electrical component, device, or network comes to an end and provides a point of connection. The terminal 1008 may simply be the ends of wires connected to the first electrode 1006 and the second electrode 1004. In other embodiments, the terminal 1008 comprises other circuit elements that intervene between the first electrode 1006 and/or the second electrode 1004 and a point of connection. In certain embodiments, discussed below, the terminal 1008 includes a regulation module 1302 that ensures that the voltage at the point of connection of the terminal 1008 is a regulated voltage. In certain embodiments, the terminal 1008 connects to an external load. In other embodiment, the terminal 1008 connects to internal components of the hydrogen generation system discussed above and provides power to them. For example, the terminal 1008 may connect to the heating module 104 and provide power for the heating module 104.

As discussed above, the feeder module 106 provides a stream of liquid alkali metal 1002 (such as molten sodium) to the reaction chamber 210 where the liquid alkali metal 1002 interacts with the water 114. The byproduct of this reaction includes hydrogen gas and steam 116. As described above, the reaction is strongly exothermic.

In one embodiment, the stream of liquid alkali metal 1002 acts as an anode with the first electrode 1006 in the stream of liquid alkali metal 1002, and the second electrode 1004 in the water 114 acts as the cathode. Negatively charged anions move towards the anode and positively charged cations move away from the anode. Electrons flow from the stream of liquid alkali metal 1002 to the second electrode 1004. The circuit comprising the stream of liquid alkali metal 1002, the first electrode 1006, the terminal 1008, and the second electrode 1004 thus operates as a battery and can provide electric energy to electronic loads connected to the terminal 1008. Such a configuration may increase the efficiency of the overall system by capturing and making available energy that would have otherwise been lost as heat.

Figure 11:
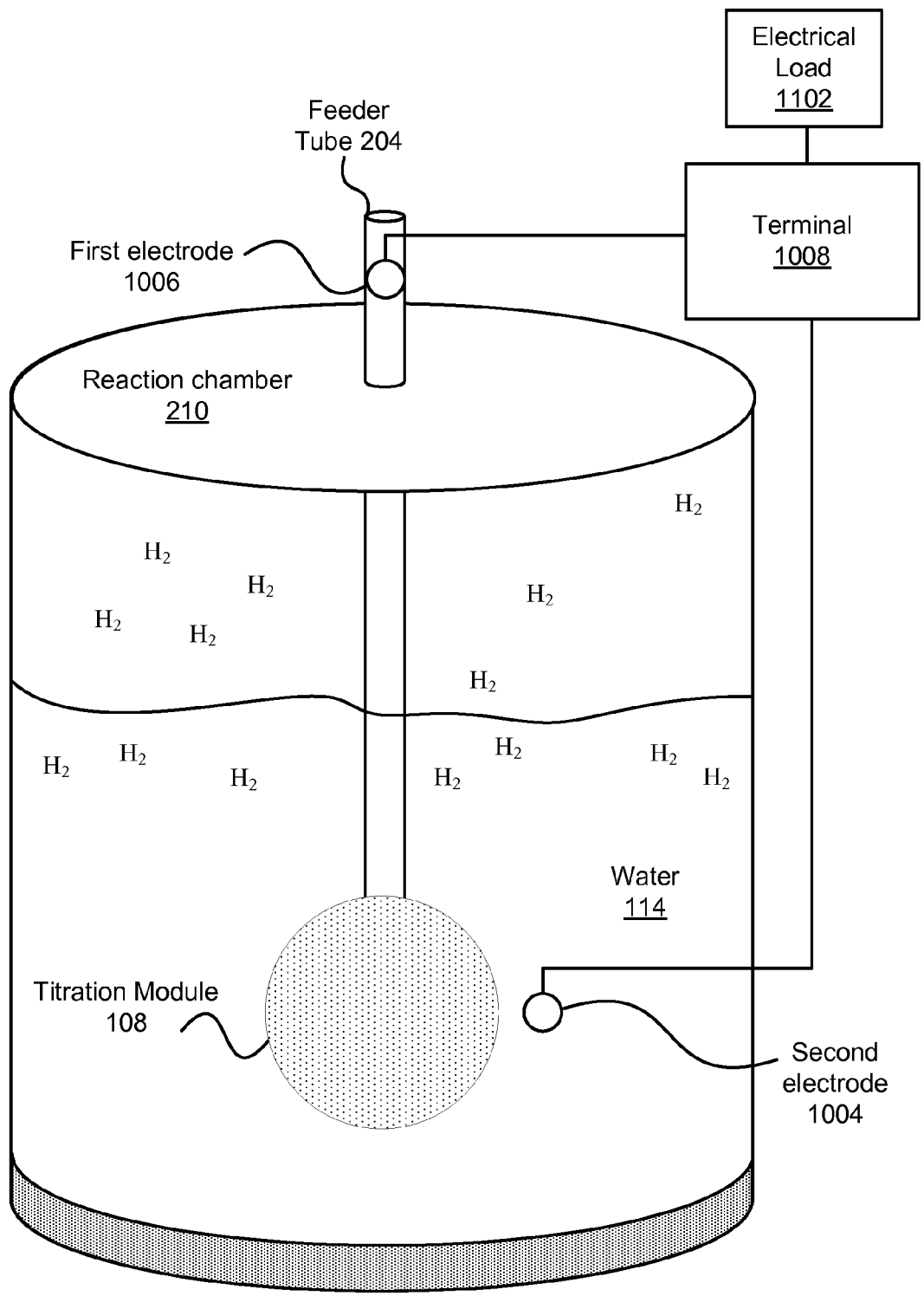
FIG. 11 is a functional block diagram illustrating an embodiment of an apparatus for producing electrical energy as part of a hydrogen generation process.

FIG. 11 shows one embodiment of a reaction chamber 210 configured to capture electrical energy. As shown in FIG. 11, the reaction chamber 210 may have a feeder tube 204 that is coupled to a titration module 108. The feeder tube 204 may provide a passageway through which the stream of liquid alkali metal 1002 is transported to the titration module 108. As discussed above, the titration module 108 is a component that interfaces the stream of liquid alkali metal 1002 with the water 114 in a controlled manner. The titration module 108 may include, for example, a filter.

The titration module 108 may be situated within the water 114 of the reaction chamber 210 and may receive the stream of liquid alkali metal 1002 from the feeder tube 204. As seen in FIG. 11, and as discussed above, one of the byproducts of the interaction of the liquid alkali metal 1002 with the water 114 is hydrogen $H_2$. This hydrogen may be used to provide fuel for a fuel cell.

In one embodiment, the first electrode 1006 is situated within the feeder tube 204. The first electrode 1006 may be a copper wire inserted into the feeder tube 204. The first electrode 1004 may be an electrically conductive lining built into the feeder tube 204. The first electrode 1004 may be a ring that is placed within the feeder tube 204 that is in electrical communication with the stream of liquid alkali metal 1002. Other configurations for a first electrode 1006 may also be used.

In one embodiment, the electrodes 1004, 1006 are positioned to maximize efficiency. For example, the electrodes 1004, 1006 may be placed close to a reaction interface where the alkali metal 1002 reacts with the water 114. This may reduce resistance which may increase efficiency in electrical energy creation. In one embodiment, the feeder module 106 and/or the titration module 108 may include a conductive pathway or liner as part of the first electrode 1006 to place the first electrode 1006 close to the reaction interface. In another embodiment, the first electrode 1006 is located near the reaction interface. The second electrode 1004 may also be shaped or positioned next to the reaction interface to increase efficiency. For example, the second electrode may 1004 be shaped to be near or a same distance away from openings in the titration module 108. One of skill in the art will recognize other ways to position and/or shape the electrodes 1004, 1006 to increase efficiency.

The first electrode 1006 may also be situated in other locations. In one embodiment, the first electrode 1006 is situated within the titration module 108. In another embodiment, the first electrode 1006 is situated within a pump that is connected to the feeder tube 204. The first electrode 1006 may also be situated in other locations where the first electrode 1006 is in electrical communication with the stream of liquid alkali metal 1002.

The second electrode 1004 is situated within the water 114 of the reaction chamber 210. In one embodiment, the second electrode 1004 is situated proximate to the titration module 108 in the reaction chamber 1004. In certain embodiments, the precise proximity of the second electrode 1004 to the titration module 108 is determined by the amount of energy the designer wishes to generate. The amount of energy produced by the battery comprising the first electrode 1006 and the second electrode 1004 may vary based at least in part on the proximity of the second electrode 1004 and the titration module 108.

In certain embodiments, the second electrode 1004 is built into the reaction chamber 210 at a fixed position relative to the titration module 108. The second electrode 1004 may be built in a variety of shapes. In one embodiment, the second electrode 1004 is a metal strip fixed within the reaction chamber 210. In another embodiment, the second electrode 1004 is a mesh that attaches to the feeder tube 204 and surrounds the titration module 108. The mesh may, in one embodiment, be shaped as a sphere that surrounds the titration module 108. Other configurations for the second electrode 1004 may also be used.

FIG. 11 shows the first electrode 1006 and the second electrode 1004 coupled to a terminal 1008. The terminal 1008 may be configured to couple to an electrical load 1102. In certain embodiments, the electrical load 1102 is a device within the apparatus described above to produce hydrogen. For example, the terminal 1008 may provide electrical power to one or more components in the system shown in FIG. 1. In other embodiments, the terminal 1008 is configured to connect in series with the terminal of a fuel cell and then connect to an electrical load 1102. Such a configuration may provide additional voltage to the electrical load 1102. The terminal 1008 may also, in certain embodiments, be connected in parallel with the terminal of a fuel cell and then connected to the electrical load 1102 such that additional current is provided. Other possible configurations are also possible.

Figure 12:
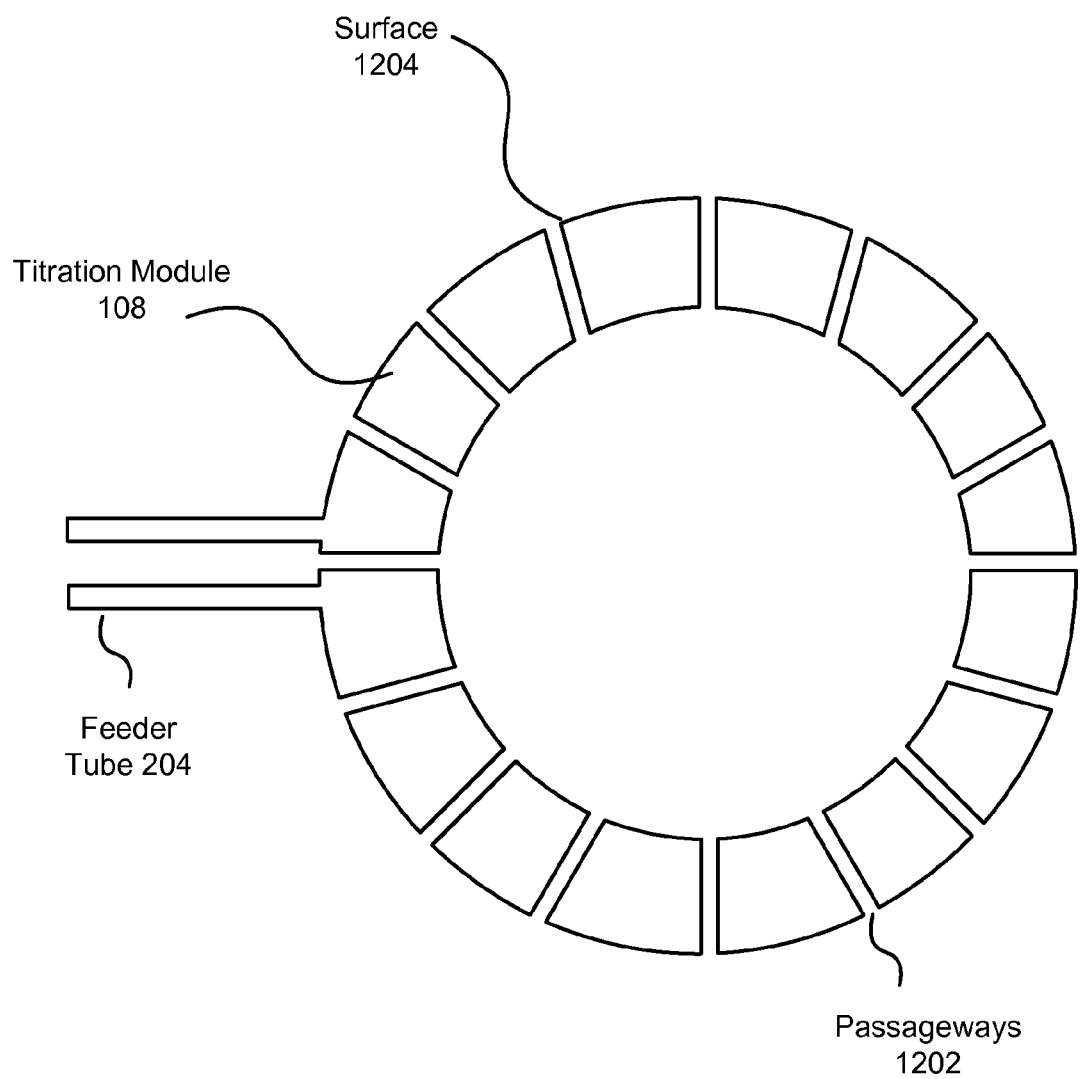
FIG. 12 is a cut away view of one embodiment of a titration module that may be used for producing electrical energy and hydrogen.

FIG. 12 shows a cut-away view of one possible embodiment of a titration module 108 connected to a feeder tube 204. The titration module 108 includes a plurality of passageways 1202 that allow liquid alkali metal 1002 to interact with the water 114 in the reaction chamber 210. The term "passageways" is used broadly to encompass any passage with an entrance and an exit through which a fluid, gas, or properly sized solid can move. Thus, a passageway may be a tunnel, a channel, a hole, a capillary, or other type of passage. The passageways 1202 may connect the feeder tube 204 with the surface 1204 of the titration module 108. The passageways 1202 separate the stream of liquid alkali metal 1002 that enters the titration module 108 through the feeder tube 204 into a plurality of streams of liquid alkali metal 1002.

The depiction of the titration module 108 is simply one embodiment of a titration module 108 having passageways 1202. The passageways 1202 may be longer or shorter; in certain embodiments, the passageways 1202 are holes in the surface 1204 of the titration module 108 that separate the stream of liquid alkali metal 1002 into a plurality of streams. In certain embodiments, the liquid alkali metal 1002 in the plurality of streams is consumed at the interface that occurs at the surface 1204 of the titration module 108, which may create an interface between the liquid alkali metal 1002 and the water 114. The term consumed, as used in this context, means that the reaction occurs at the surface 1204 and that droplets of liquid alkali metal 1002 do not leave the surface 1204 and enter the water 114. The rate of flow of liquid alkali metal 1002 may be controlled in order to ensure that the liquid alkali metal 1002 is consumed at the surface of the titration module 108 where the liquid alkali metal 1002 interfaces with the water 114. In certain embodiments, liquid alkali metal 1002 may be consumed at locations other than the surface 1204 during startup; in such embodiments, the liquid alkali metal 1002 may be consumed at the surface 1204 during steady state operation.

Figure 13:
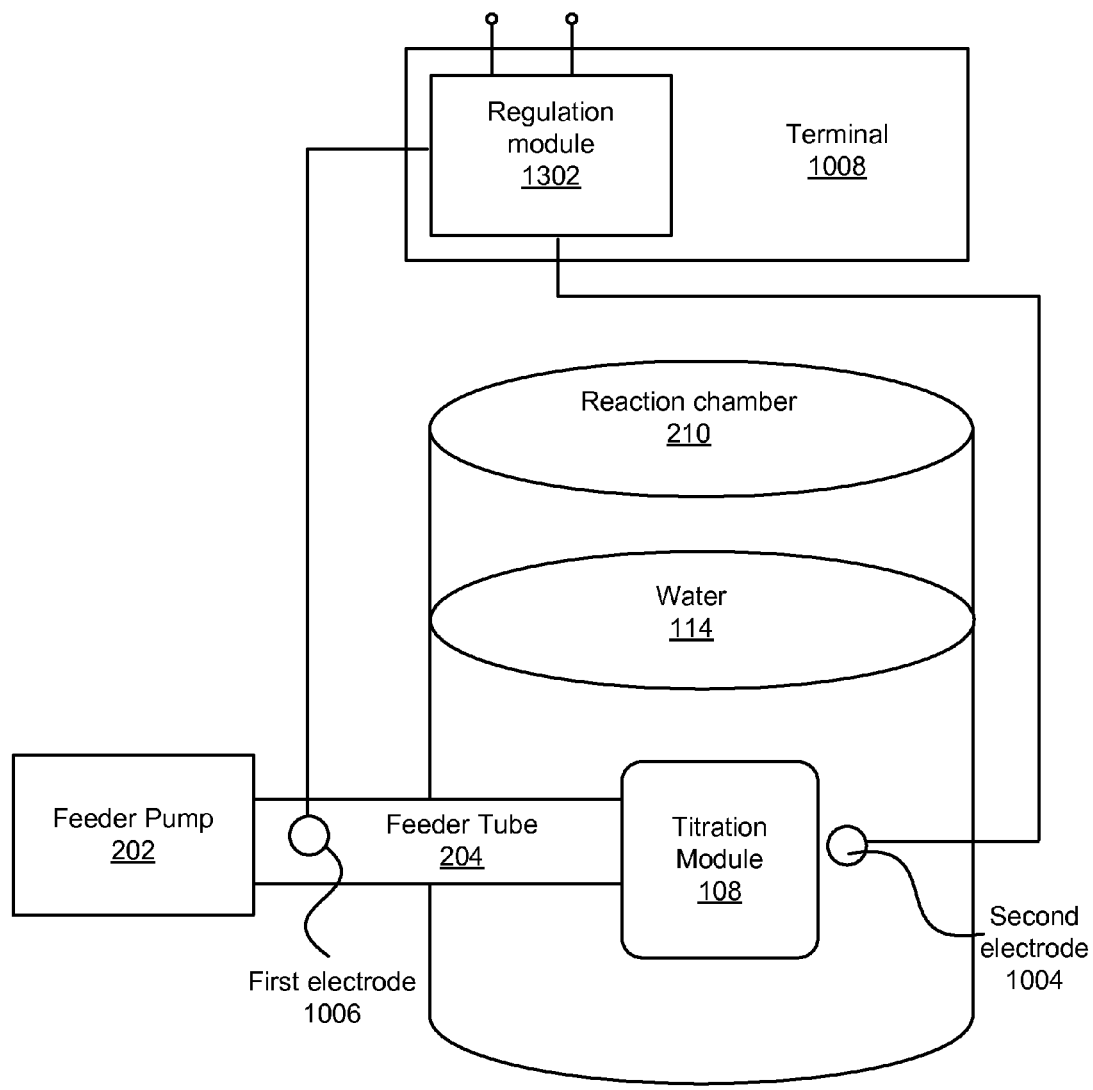
FIG. 13 is a functional block diagram illustrating an embodiment of an apparatus for producing electrical energy as part of a hydrogen generation process using a regulation module.

FIG. 13 shows one embodiment of a system where the terminal 1008 includes a regulation module 1302. As described above, the system may include a feeder pump 202 coupled to a feeder tube 204 that provide a stream of liquid alkali metal 1002 to the titration module 108. The titration module 108 may comprise a series of passageways 1202 that divide the stream of liquid alkali metal 1002 received through the feeder tube 204 into a plurality of streams of liquid alkali metal 1002 as discussed above. The plurality of streams of liquid alkali metal 1002 may interact with the water 114 and be consumed producing, among other things, hydrogen.

The first electrode 1006 may be inserted into the feeder tube 204 such that the first electrode 1006 is in electrical communication with the stream of liquid alkali metal 1002. The second electrode 1004 may be in electrical communication with the water 114. This may cause current to flow through a terminal 1008 coupled to the first electrode 1006 and the second electrode 1004 when the stream of liquid alkali metal 1002 reacts with the water 114.

In certain embodiments, the terminal 1008 includes a regulation module 1302. The regulation module 1302 receives the electrical energy from the first electrode 1006 and the second electrode 1004 and provides a regulated voltage at the outputs of the terminal 1008 as an output. The regulation module 1302 may comprise a microcontroller and other hardware (such as capacitors, inductors, transformers, power meters, switches, and other suitable hardware) for measuring the input energy and ensuring that the output energy is within tolerance. The regulation module 1302 may thus ensure that the output voltage at the terminal 1008 is well regulated and thus useful for one or more electrical loads 1102 that may be attached.

Figure 14:
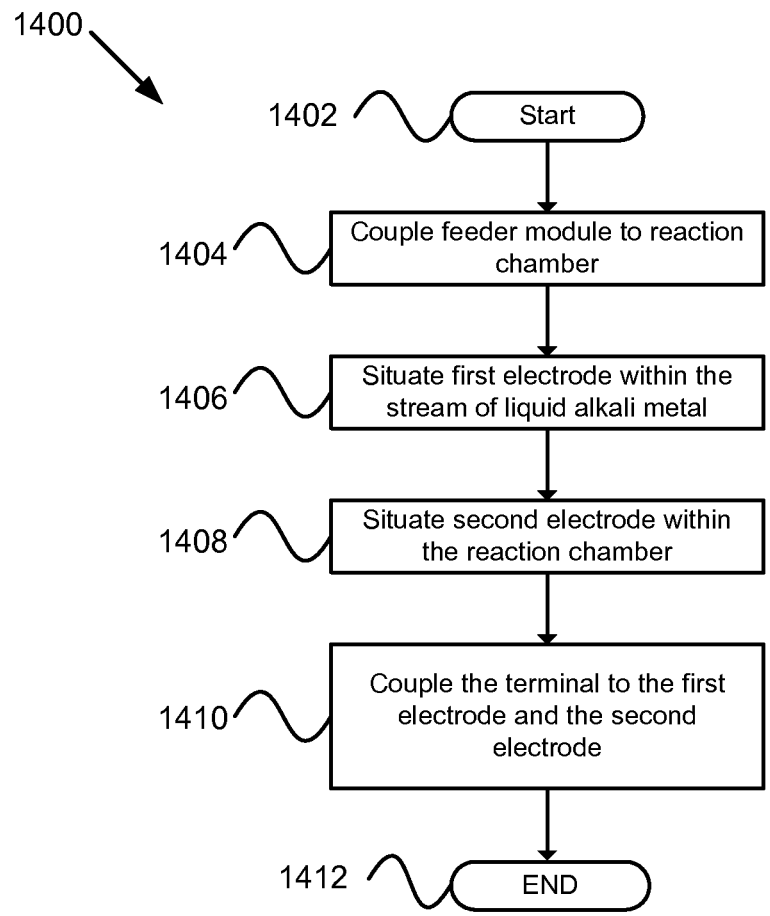
FIG. 14 is a schematic flow chart illustrating one embodiment of a method for producing energy according to the present invention.

FIG. 14 is one embodiment of a method 1400 for capturing electrical energy from a process for creating hydrogen. In one embodiment, the method starts 1402 with coupling 1404 the feeder module 106 to the reaction chamber 210. The method may also involve situating 1406 the first electrode 1006 within the stream of alkali metal 1002, and situating 1408 the second electrode 1004 within the reaction chamber 210. In one embodiment, the second electrode 1004 is situated within the water 114 in the reaction chamber and proximate to the titration module 108. The method may further involve coupling 1410 the terminal 1008 to the first electrode 1006 and the second electrode 1004. As noted above, in certain embodiments, there may be other intervening components between the first electrode 1006, the second electrode 1004, and the terminal 1008. The method may then end 1412. When the apparatus begins producing hydrogen, the system described in the method 1400 above may begin to capture electrical energy that could have otherwise been lost as heat.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for producing energy, the apparatus comprising:
   a feeder module that conveys a stream of liquid alkali metal to a reaction chamber containing water, the liquid alkali metal and the water interacting in the reaction chamber;
   a first electrode that is in electrical communication with the stream of liquid alkali metal;
   a second electrode that is in electrical communication with the water in the reaction chamber; and
   a terminal coupled to the first electrode and the second electrode.

2. The apparatus of claim 1, further comprising a titration module that is situated within the water of the reaction chamber and that receives the stream of liquid alkali metal from the feeder module, the titration module separating the stream of liquid alkali metal into a plurality of streams of liquid alkali metal.

3. The apparatus of claim 2, wherein the titration module comprises a plurality of passageways that separate the stream of liquid alkali metal into the plurality of streams of liquid alkali metal, the plurality of passageways connecting the feeder module and a surface of the titration module.

4. The apparatus of claim 3, wherein the liquid alkali metal in the plurality of streams of liquid alkali metal is consumed at the surface of the titration module.

5. The apparatus of claim 2, wherein the second electrode is situated proximate to the titration module.

6. The apparatus of claim 1, wherein the terminal is connected in series with a terminal of a hydrogen fuel cell that receives hydrogen generated in the reaction chamber.

7. The apparatus of claim 1, wherein the terminal further comprises a regulation module connected to the first electrode and connected to the second electrode, the regulation module providing a regulated voltage at the terminal.

8. The apparatus of claim 1, wherein the liquid alkali metal comprises molten sodium.

9. The apparatus of claim 1, wherein the first electrode is a conducting wire inserted into the liquid alkali metal.

10. The apparatus of claim 1, wherein the second electrode comprises a noble metal.

11. The apparatus of claim 8, wherein the second electrode comprises one of gold and platinum.

12. The apparatus of claim 1, wherein the feeder module comprises a feeder tube.

13. The apparatus of claim 1, wherein the feeder module further comprises a heater that heats the stream of liquid alkali metal to a temperature above a melting point of the alkali metal.

14. The apparatus of claim 1, wherein the feeder module conveys the stream of liquid alkali metal to the reaction chamber at a rate selected to control the reaction of the liquid alkali metal with the water.

15. A system for producing energy, the system comprising:
   a reaction chamber that retains water at a level sufficient to react an alkali metal with the water;
   a heating module that heats the alkali metal to a temperature above a melting point of the alkali metal, wherein the alkali metal is converted to a liquid form;
   a titration module that separates the liquid alkali metal into alkali metal droplets, the alkali metal droplets separated at a distance selected to avoid re-association of the alkali metal droplets, the titration module controlling a size of the alkali metal droplets such that the alkali metal droplets completely react with the water before the alkali metal droplets reach a surface of the water;
   a feeder module that conveys the alkali metal to the reaction chamber at a rate selected to control the reaction of the liquid alkali metal with the water;
   a first electrode situated within the liquid alkali metal;
   a second electrode situated within the water in the reaction chamber;
   a terminal coupled to the first electrode and the second electrode; and
   a fuel cell that uses hydrogen gas created in the reaction chamber as a fuel.

16. The system of claim 15, wherein the reaction chamber is configured to circulate water through the reaction chamber.

17. The system of claim 15, wherein the heating module maintains the titration module at a temperature above a melting point of the alkali metal.

18. The system of claim 15, further comprising a combustion unit that combusts the hydrogen gas.

19. The system of claim 15, wherein the terminal is connected in series with a terminal of the fuel cell.

* * * * *